United States Patent [19]

Di Maio

[11] 4,033,480

[45] July 5, 1977

[54] MULTIPLE FLUID DISPENSER

[75] Inventor: Anthony E. Di Maio, Georgetown, Mass.

[73] Assignee: Marson Corporation, Chelsea, Mass.

[22] Filed: June 17, 1975

[21] Appl. No.: 587,655

[52] U.S. Cl. .............................................. 222/129
[51] Int. Cl.² ......................................... B67D 5/54
[58] Field of Search ............ 222/146 HE, 145, 129, 222/506, 144, 484–487; 251/206, 207; 141/100, 237; 239/394

[56] References Cited

UNITED STATES PATENTS

| 892,741 | 7/1908 | Kops | 239/414 |
|---|---|---|---|
| 1,333,048 | 3/1920 | Webster | 251/207 X |
| 1,471,867 | 10/1923 | Steere | 222/144 |
| 2,379,532 | 7/1945 | Lloyd | 222/129 |
| 2,430,501 | 11/1947 | Galbally | 222/129 X |
| 2,745,572 | 5/1956 | Talbott | 222/146 HE X |
| 2,850,990 | 9/1958 | Rasmusson | 222/485 X |
| 2,889,852 | 6/1959 | Dunlap | 251/206 X |
| 3,303,970 | 2/1967 | Breslau et al. | 222/134 |
| 3,306,495 | 2/1967 | Wabers | 222/145 X |

Primary Examiner—Stanley H. Tollberg
Assistant Examiner—Norman L. Stack, Jr.
Attorney, Agent, or Firm—Pennie & Edmonds

[57] ABSTRACT

An apparatus for use in the concurrent dispensing of preferably, viscous material in a predetermined ratio from at least two containers of separate material. Discharge structure associated with each container and interconnected permits simultaneous discharge in a predtermined ratio.

14 Claims, 7 Drawing Figures

MULTIPLE FLUID DISPENSER

FIELD OF THE INVENTION

The present invention is directed to a metering apparatus and, more specifically, a novel and improved metering apparatus which safely provides for positively controlling and ensuring that a predetermined ratio of flowable material may be dispensed from a plurality of descrete material sources.

DESCRIPTION OF THE PRIOR ART

In the particular field of automobile body repair work, known viscosity fluid materials such as, for example, automobile body solder, automobile body filler and other filler compositions are normally mixed to provide a material which may be applied to a damaged auto body so as to enable the repair thereof. Ordinarily, these ingredients are somewhat difficult to handle and, preferably, are required to be admixed in a predetermined ratio so as to provide for optimum results. Typically, however, it is common practice in the field to have a worker approximate the quantity of the various materials which are desired to be mixed at any particular instance.

In other situations, the removal of materials from the container is accomplished by scooping with a spatuala or the like. Such procedure, however, has several drawbacks, among which is that the material might get on the hands and considering the corrosive effects of such materials the skin may be adversely affected. In addition, the dispensing of approximate amounts is somewhat disadvantageous in the sense that in many circumstances, especially with relatively unskilled workers, the correct ratio of materials dispensed is not always achieved. The consequent result is that the final hardened product may not be entirely suitable for the purposes intended.

Aside from the foregoing disadvantages, the dispensing of inaccurate quantities often results in the uneconomical usage of the materials involved. Accordingly, there is a correspondingly higher likelihood of increased costs for such materials. Since the viscosity of the viscous material is a function of temperature, difficulty in the dispensing frequently occurs at colder temperatures. This drawback is further compounded by the fact that with several different materials which are to be admixed in a predetermined ratio, the degree to which they are affected by the temperature will, of course, vary. Consequently, ensuring the correct intermixture of several high viscous materials is even more difficult to successfully achieve. It will, of course, be recognized that should such predetermined ratios be inconsistently dispensed in repeated usages, the final products will correspondingly vary.

With relatively more experienced workers in auto body repair shops, there might exist a desire to vary somewhat from the recommended mixing proportions for the various high viscous materials based on such worker's personal preference as to the type of consistency which would perform adequately in certain circumstances. Heretofore, however, known techniques and devices through which this variance could be provided for did not allow such to be accomplished in a simple, convenient and yet highly versatile manner.

Another disadvantage generally associated with the discharge of high viscosity solutions in many automobile repair shops is the fact that the material containers are often located in inconvenient areas and are not capable of being moved to a variety of positions.

In general, there are known devices which serve to dispense material from a container through the application of fluid pressure. Such devices, however, might give rise to a relatively dangerous situation should excess pressure build up within the container to the extent that the container and the cylinder heads associated therewith would rupture and/or be propelled outwardly. As a consequence thereof, personal and property damage might ensue. Normally, such situations may be avoided through the use of a fluid pressure relief valve that typically serves to vent excess pressure within a confined area, such as a container. Although the foregoing valve arrangement is suitable under ordinary circumstances, nevertheless, it might occur that the pressure relief valve itself would fail. In such eventuality, a similar unsafe condition would prevail in the container.

SUMMARY OF THE INVENTION

Accordingly, it becomes an object of the present invention to overcome the aforedescribed disadvantages associated with dispensing materials, especially high viscous materials in an auto body repair shop.

In accordance with the present invention there is provided an apparatus for safely and selectively dispensing predetermined ratios of viscous fluid from a plurality of discrete sources comprising at least two separate container means, each containing a different type of material to be dispensed, one of the container means having a first outlet opening means with a cross-sectional area which is at a predetermined ratio with respect to a second outlet opening means in the other of the container means, such that the ratio of material dispensed from the first opening means, in comparison to the material dispensed from the second opening means will correspond to the desired ratio intended to be mixed from the materials in said container means, valve means associated with each of the first and second outlet opening means and being actuatable to selectively open and close the valve means for enabling the simultaneous and uniform opening and closing of the first and second outlet opening means. In a preferred embodiment, the novel and improved dispenser apparatus includes heating means associated with the container means for selectively relatively decreasing viscosity of the fluid materials in the container means. In addition, such dispensing apparatus may comprise adjustment means associated with at least one of the valve means for enabling the independent selective adjustment of the fluid material flowing from one of the container means which includes a rotatable dispensing plate having a plurality of different dimensioned dispensing apertures circumferentially spaced from each other, and detent means for selectively locking each of the dispensing apertures adjacent one of the first means for enabling adjustment of the flow rate from the one container means. Moreover, the dispensing apparatus may include a pressure or propelling means which ensures that equal fluid pressure is in each of the containers. It will, of course, be appreciated that the force acting on such fluid materials will vary in accordance with the cross-sectional area of the containers. The present invention further contemplates a mounting bracket which supports both of the containers for pivotal movement about an upstanding support for the dispensing apparatus.

Additionally, the present invention contemplates arranging the removable cylinder heads which are associated with the containers of material by vertical support rods in a manner such that should excessive pressure exist within the container these cylinder heads would be enabled to generally tilt upwardly so as to allow the excess pressure to exhaust, while simultaneously being prevented from being propelled from the containers.

BRIEF DESCRIPTION OF THE DRAWINGS

The above, as well as other objects, features, and advantages of the present invention shall become apparent upon a detailed reading of a description of a preferred embodiment when viewed in conjunction with the accompaying drawings wherein like reference numerals indicate like structure throughout the several views.

FIG. 4 is an end elevational view partly in section of the dual metering apparatus of the present invention;

DETAILED DESCRIPTION

Figure 1:
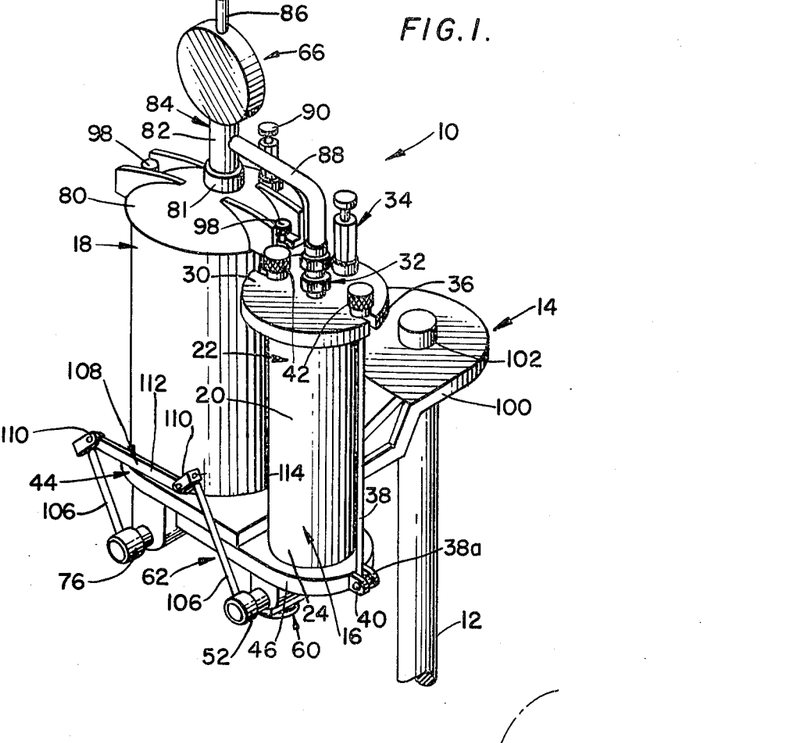
FIG. 1 is a perspective view of the dual metering apparatus of the present invention pivotally mounted on an upright support member.

Referring to the drawings and, in particular, to FIG. 1 there is depicted a metering apparatus embodying the principles of the present invention and generally designated by reference numeral 10. In the particular embodiment being illustrated, such metering apparatus 10 is pivotally mounted on an upright support column 12 by support means 14 for purposes subsequently made evident. Although the succeeding description is directed to a dual metering apparatus 10 it should, of course, be understood that the principles of the present invention envision several separate and distinct material sources which are all designed to be conjointly operated in a manner which enables metering of a plurality of such materials in a predetermined mixing ratio.

Figures 4, 7:
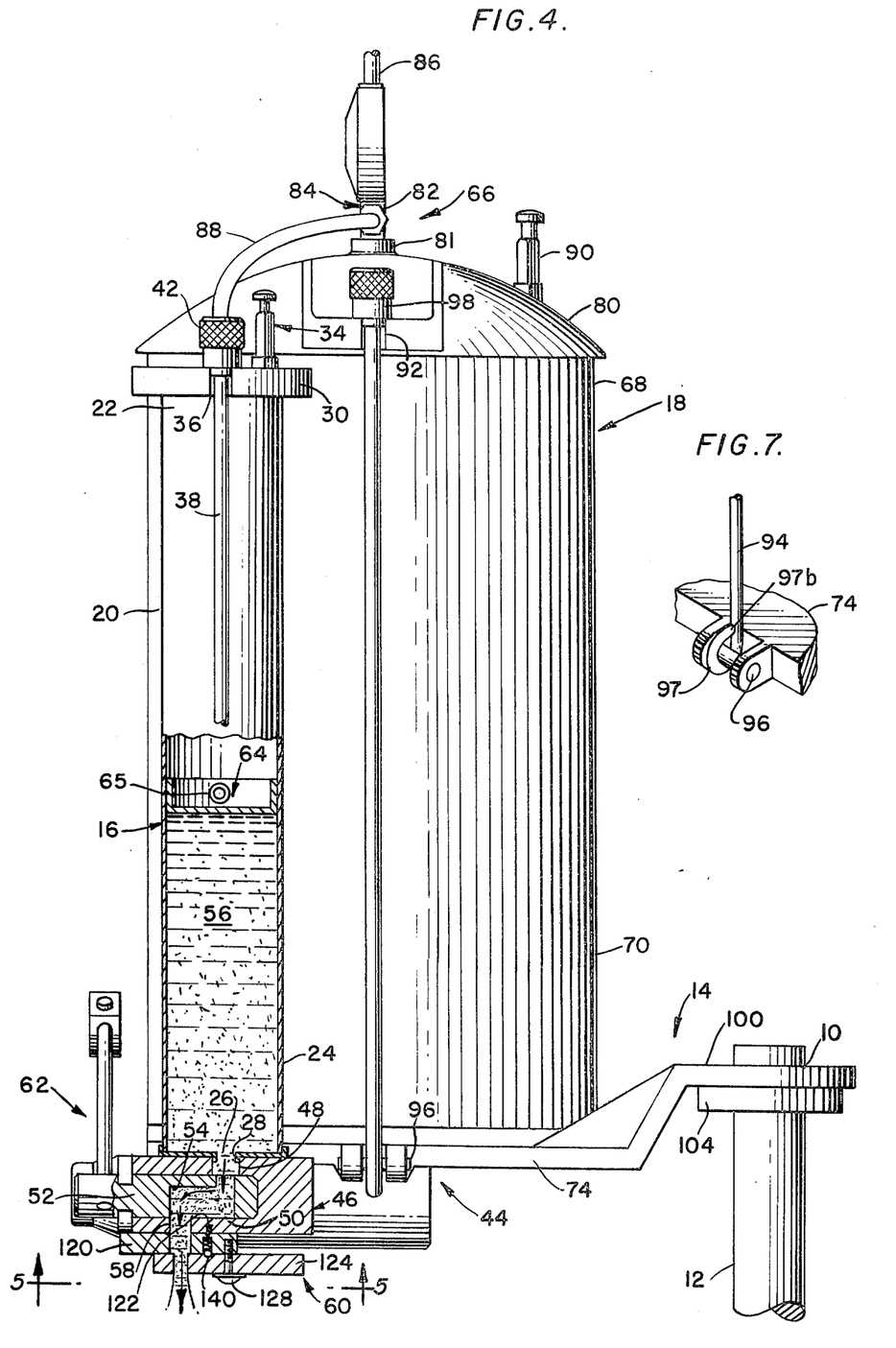

With continued reference to FIG. 1 taken in conjunction with FIG. 4 there are shown container means 16 and 18. Essentially, both container means 16 and 18 are similarly constructed. Container means 16 may take any convenient configuration and in the embodiment being shown is defined by a generally cylindrical member 20 having an open ended portion 22 and opposite thereto a closed end portion 24. Closed end portion 24 may have a centrally formed opening 26 therethrough with a flange portion 28.

Figure 3:
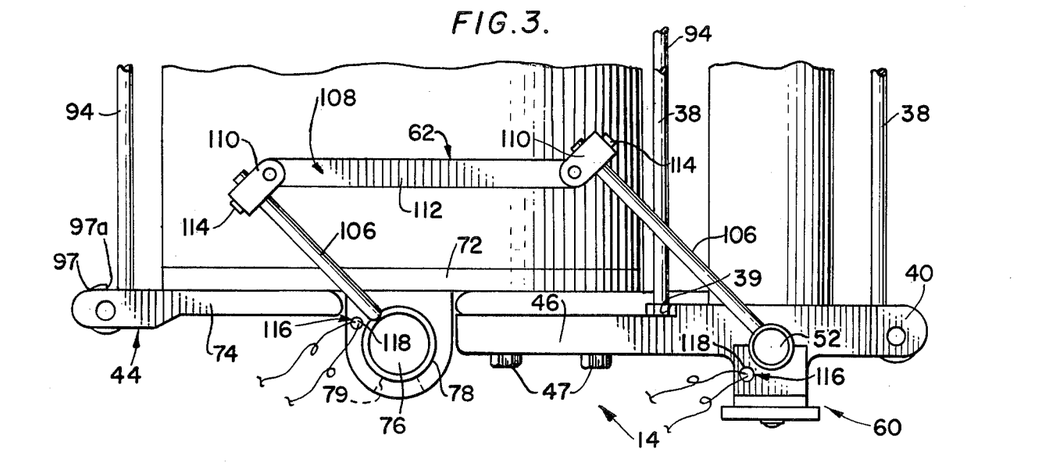
FIG. 3 is a fragmented front elevational view of the present invention illustrating in somewhat greater detail the interconnection means of the present invention.

Removably fitted to open end portion 22 is a generally circular cylinder head member 30. A conventional fluid inlet fitting means 32 is detachably connected, in a known fashion, to cylinder head member 30 for purposes of enabling a pressurized fluid to enter container means 16 from a fluid pressure source (not shown). Also operatively connected to the cylinder head member and in fluid communication with the interior of the container means 16 is any suitable type of one-way pressure relief valve 34. Relief valve 34 serves to prevent excess fluid pressure from accumulating within container 16 by enabling such excess pressure to escape upon a predetermined pressure value being reached. To enable the removable connection of cylinder head member 30 from the cylinder, the former includes a pair of diametrically opposed slots 36. Such slots 36 are adapted to receive the threaded free ends of support rods 38. One of the rods 38, as best shown in FIG. 3, has its end threadedly or otherwise fixedly connected at 39 to support means 14. As perhaps best viewed in FIG. 1, the other of the support rods 38 is pivotally mounted as at 40 to the support means 14. The particular significance of the relationship of the support rods 38 to the support means 14 will be subsequently described. Threaded knobs 42 threadedly cooperate with the threaded ends of support rods 38 whenever the latter are in their assembled condition, such as shown in FIG. 1. It will be understood, of course, that whenever the cylinder head member 30 is desired to be removed, the knobs 42 are unfastened to the extent that they permit the head member 30 to be moved outwardly. As a consequence thereof, the head member 30 and container may be removed so as to enable a new container to be placed in operation.

In connection with the support means 14 reference is made to FIGS. 1, 3 and 4. As depicted therein, the support means may include a generally horizontal bracket means 44 and a generally horizontal support member 46 appropriately fastened to the bracket means by suitable fasteners 47 or the like. Regarding the support member 46, it is formed with a generally veritcal opening 48 which is aligned with opening 26 in closed end portion 24. As noted, the flange 28 may protrude into opening 48. In communication with vertical opening 48 is barrel-shaped opening 50 within which is suitably rotatably housed an outlet valve member 52. Such valve member has a passage 54 which has an inlet that is selectively placed in communication with opening 48. Whenever valve member 52 is in such position, such as shown in FIG. 4, the material 56 in the container 16 is able to flow through passageway 54 and be dispensed through the outlet opening 58 formed in support member 46. As clearly shown in FIG. 4, located adjacent outlet 58 is the adjustable metering means 60. Such metering means 60 will be afterwards more fully described. Connected to the tapered forward part of the valve member, in a manner to be presently described, is the interconnection means 62 of the preferred embodiment. The valve member 52 is selectively rotatable, in a well-known manner, in response to direct displacement of the interconnection means 62 such that the valve member 52 may block outlet opening 58, to thereby inhibit the flow of material 56. The cylinder 16 may have also disposed therein a follower piston 64. Such follower piston 64 is essentially arranged to be placed on the top of the column of material 56 and may be of a reusable or throw-away type. An eyebolt 65 or other similar device threadedly cooperates with an opening in the follower piston. It enables venting of air from beneath the piston 64 whenever such piston is inserted in the container and placed over the column of material and such eyebolt is removed from the opening. After the piston is at rest on top of material 56 the eyebolt 65 is connected to the piston. Basically, the piston 64 whenever in this position serves to facilitate the propelling of material from the container and to evenly distribute the fluid force which is directed on the material 56 from fluid pressure means 66 so that all the material 56 may be dispensed evenly instead of having the pressurized fluid only act on portions of the material housed in the container 16, with the consequent result of incomplete dispensing.

With reference to container 18 of the instant invention, it too, may have a generally cylindrical configuration with opposed open and closed end portions 68 and 70, respectively. Such closed end portion 70 is, as with closed end portion 24 of cylinder means 16, formed with an opening (not shown). The closed end portion 70 is supported on the bracket means 44. The bracket means 44 of the present invention may include a bracket plate portion 72 and a generally horizontal bracket support portion 74. The bracket plate portion 72 suitably supports the closed end portion 70 of the container means 18. Such bracket plate portion 72 will likewise have an opening (not shown) which registers with the opening in closed end portion 70 for permitting the material contained in container means 18 to flow outwardly. It will be appreciated that such openings are arranged similarly as in container means 16. A valve member 76 is rotatably disposed within a barrel-shaped opening 78 formed in the bracket plate portion 72 of bracket member 44. Since valve member 76 is substantially similar in structure and function to that of valve member 52, a detailed description thereof has not been provided. An outlet opening 79 for passage of material is formed in the bracket plate portion 72 with a cross-sectional area which is in a corresponding ratio to the cross-sectional area of opening 58 so that it corresponds to the ratio of materials which are desired to be admixed. It will also be understood, of course, that the outlet 79 in the bracket portion 72 is located and formed such that it communicates with the passageway (not shown) in valve member 76, whenever the valve member 76 is suitably situated in an open position. For purposes of illustration and not limitation if, for example, the material in container 18 is desired to be mixed in a ratio of 5 to 1 with respect to the material 56 in container means 16, then the cross-sectional area of outlet 79 in bracket portion 72 would be five times greater than outlet opening 58.

As best shown in FIGS. 1 and 4, the open end portion 68 of container 18 may have removably connected therewith a generally dome-shaped cylinder head member 80 having an opening 81 which, in a conventional manner, is suitably fit within open end portion 68. Such opening 81 is operatively connected to pressure means 66. Pressure means 66 may include a standard type of fluid fitting 82 connected to opening 81 in the top portion of cylinder head 80 and a conventional type of pressure regulator means 84 that serves to supply and limit the fluid pressure being applied to the materials in containers 16 and 18. Inlet pipe 86 communicates with the pressure regulator means 84 to supply a fluid pressure from an appropriate source (not shown). A branch pipe 88 fluidically interconnects pressure regulator means 84 and fluid fitting means 32 so as to establish communication between the container means 18 and 16, respectively. In this particular manner, the materials in both containers 16 and 18 are subjected to the same fluid pressure. Likewise, container means 18 may have a follower plate (not shown) which is similar to follower plate 64 described as being used in association with cylinder 16. Since the fluid pressure in both containers is the same, it will be appreciated that the force acting on the materials in each of the containers 16 and 18 is a function of the corresponding cross-sectional areas of the respective containers. Accordingly, greater force will be applied in container 18 than in container 16 by virtue of the former having a larger cross-sectional area. A pressure relief valve 90 similar to relief valve 34 is also operatively connected to the dome-shaped cylinder head 80 for purposes of exhausting excess pressure within container 18. By the aforenoted constructional arrangement of components immediate and uniform dispensing of the materials in the containers is significantly enhanced. At this time, mention should be made that the spirit and scope of the present invention envisions that if, for example, the ratio of the mixture of the two materials is 5 to 1 then the amount of material of the respective containers 16 and 18 correspondingly has the same ratio. In this particular manner, both containers 16 and 18 will empty at approximately the same time.

Dome-shaped cylinder head 80 is likewise formed with slots 92. Such slots 92 receive the threaded free ends of pivotal support rods 94 which are pivoted at 96 to the bracket plate 74. Knobs 98 are appropriately fastened to the support rods 94 and cooperate with slots 92. By virtue of this arrangement, the cylinder head 80 can be easily removed so as to allow for replacement with another container 18.

It will be noted in FIGS. 3 and 7, that each of the support rods 94 has a looped end 97. As clearly depicted in FIG. 3, the end 97a of the loop 97 is spaced from the vertical segment of the rod 94, whereas the end 97b of the loop 97 in FIG. 7 is welded or otherwise rigidly connected to the vertical portion of rod 94. The general purpose served by this particular type of arrangement is that it establishes an additional safety back-up fluid pressure mechanism in the event both the pressure regulator means and safety valve fail. In particular, should both the fluid regulator and relief valve fail to perform their intended functions, excessive fluidic pressure would build up within container means 18. Consequently, there will be a tendency for the resulting pressure forces to expel dome-shaped member 80 and urge support rods 94 upwardly from the container 18. By reason of open loop end 97a being spaced from the remainder of one of the rods 94, and the force which is exerted on this particular rod, there is a tendency for this particular loop 97 to straighten or elongate. Accordingly, open loop end 97a becomes farther separated from the vertical portion of the rod 94. As this occurs, that portion of dome member 80 adjacent rod 94 with open loop end 97a will be able to rise such that the underneath surface is situated above the top of container 18. However, since loop end 97b of the other rod 94 is welded to the vertical portion, as shown in FIG. 7, such loop 97 will not tend to straighted out under the excessive built-up fluid pressure. The result of the foregoing relationship of welded loop end 97b and spaced or open loop end 97a is that the dome member 80 will tilt to the extent that underneath surface thereof is exposed to atmosphere while dome member 80 adjacent rod 94 with closed loop end 97b will remain substantially connected to the container 18, since the welded loop 97 did not tend to straighten out.

Referring to container 16, it will be understood that rods 38 also enable cylinder head 30 to tilt upwardly should excessive pressure build-up within container 16. Such tilting action is allowed by reason of the fact that one of the rods 38, as clearly indicated in FIG. 1, has an open loop 38a with an end spaced from the vertical portion of rod 38; whereas the diametrically opposed rod is threadedly connected as at 39 to support bracket 46. Accordingly, whenever the pressure within container 16 builds to an impermissible degree the rod 38 with open loop 38a will tend to straighten out in response to the upwardly directed forces exerted on cylinder head 30, while the rod 38 threadedly attached as at 39 will not elongate. The end result of the foregoing is that cylinder head 30 tends to tilt such that the portion thereof adjacent the rod 38 having open loop 38a will rise above the top end of the cylinder, while correspondingly permitting the pressure within the cylinder 16 to exhaust to the atmosphere. As can be fully appreciated the portion of cylinder head 30 adjacent rod 38 with threaded end 39 will substantially remain in the same position. Thus, the cylinder head 30 will not be propelled from cylinder 16. The foregoing constructional arrangement provides a simple yet reliable safety back-up feature should the pressure regulator and relief valve fail.

As earlier indicated, the support means 14 includes a bracket support portion 74. Bracket support portion 74 serves to support the bracket plate portion 72 and is also fixedly connected to the support member 46. The bracket support portion 74 has a raised portion 100 with an aperture 102. The aperture 102 is fit over the upper portion of the suppor column 12 and the raised portion 100 rests on a support flange 104. This arrangement of components facilitates greater versatility of movement for metering apparatus 10 in a workshop or the like. Additionally, the present invention envisions within its scope that bracket support portion 74 may be constructed in other types of configurations. In fact, it need not have a portion which provides for a pivotal movement. For instance, bracket support portion 74 could merely be a generally L-shaped mounting bracket which could fixedly support both container means 16 and 18 to a wall or other suitable fixture.

Figure 2:
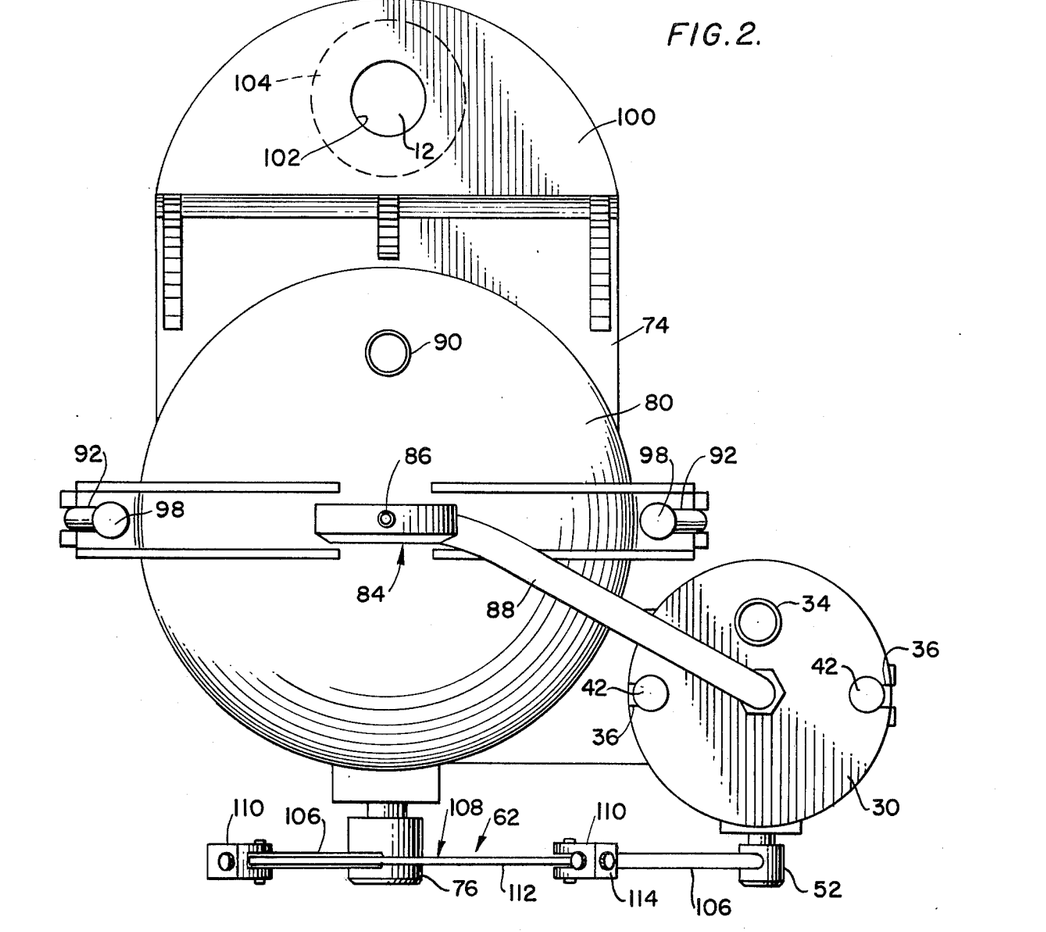
FIG. 2 is a plan view of the dual metering apparatus of the present invention.

Specifically referring to FIGS. 1 to 3, the interconnection means 62 which is made in accordance with the present invention is perhaps best shown. The present invention includes a pair of generally elongated handle members 106 and link means 108. Each handle 106 extends in generally parallel directions and is secured at one end to the valve members 52 and 76 in any appropriate manner. Link means 108 interconnects the free ends of the handle members 106 and includes clevis members 110 and interconnecting link 112. Each of the clevis members 110 are removably attached to the handle members 106 by a bolt 114 or the like in any suitable fashion. The present invention envisions that either of the bolts 114 may be unfastened, thereby permitting withdrawal of handle members 106 from the clevis members 110. By this arrangement, an operator may be able to selectively actuate individual handle members 106 and thereby valve members 52 and 76. Normally, though, the interconnecting link 112 is pivotally connected to each of the clevis members 110. As a consequence of the foregoing, it will be readily appreciated that displacement of either of the handle members 106 or interconnecting links 112 results in the conjoint movement of the respective valve members 52 and 76. Accordingly, the valve members 52 and 76 can be simultaneously opened or closed and correspondingly, therefore, dispense or cease dispensing materials. This particular arrangement in combination with both the outlet 58 and 79 having cross-sectional areas in a predetermined proportion will serve to provide for the dispensing of the materials in the intended ratio. The present embodiment also includes heater means 116 which essentially serve to heat the material within the containers 16 and 18 to a sufficient magnitude that allows free flow of material, especially if such material should be relatively viscous. Normally, the heater means 116 will be used in an environment wherein it is relatively cold. The heater means 116 may include standard types of heater rods 118 which are electrically connected to a power source (not shown) and may be inserted into the support means 14 and bracket portion plate 72, such that it is adjacent each of the valve members 52 and 76. Of course, other well-known forms of heater devices may be employed, such as, for example, industrial heat pads which would be inserted beneath the bottom of both the containers.

As observed earlier, the present embodiment of the metering apparatus 10 includes adjustable metering means 60. Such metering means 60 is perhaps best illustrated in FIGS. 5 and 6 and is shown to include a support plate 120, detent means 122 and metering plate 124. The support plate 120 is fastened to the bottom of the support means 14 through conventional bolts or the like which are, preferably, recessed within the support plate 120 for reasons of facilitating easy rotation of the metering plate 124 in close relation to the support plate 120. The support plate 120 has a centrally formed opening 126 which should be of the same size as opening 58 or should at least have an area which is equal to that needed for the desired ratio if opening 58 does not.

Figure 5:
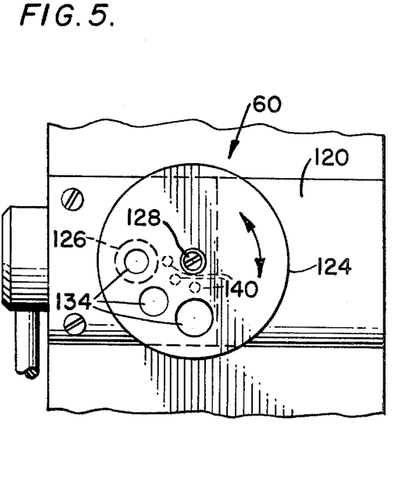
FIG. 5 is a fragmented bottom view of the novel and improved dispensing adjustment device of the present invention.
Figure 6:
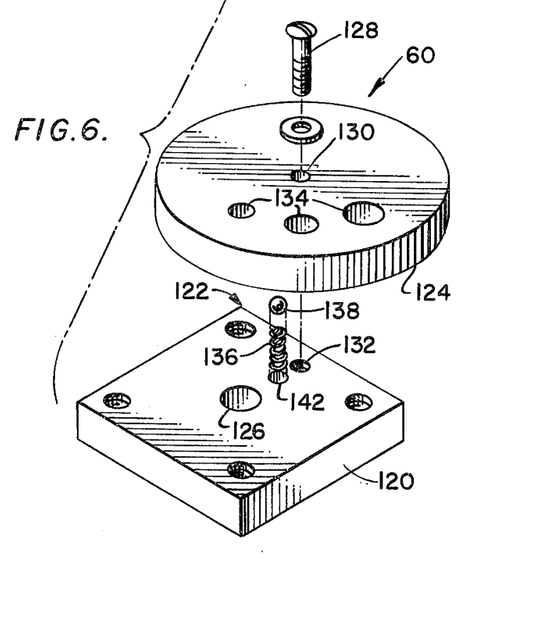
FIG. 6 is an exploded perspective view of the dispensing device illustrated in FIG. 5 and showing greater detail thereof; and, FIG. 7 is an enlarged fragmented view illustrating a welded loop of a pivotal rod made in accordance with the present inventon.

The metering plate 124 is adapted to be rotatably connected to the support plate 120 by a bolt 128 or the like which passes through opening 130 and is threadedly received into a suitable opening 132. The metering plate 124 has formed therein a plurality of circumferentially spaced metering orifices 134, three of which have been depicted in the illustrated embodiment. As will be noted each has a size which varies from the other. Of course, other numbers of orifices 134 may be provided with other sizes. Such orifices 134 can, of course, be made in predetermined sizes and such orifices should not exceed the orifice area of opening 126, otherwise no metering can be attained. Whenever the metering plate 124 is in the assembled condition it may be rotated to selectively position individual ones of the metering orifices 134 in vertical registry with the opening 126. Since the plate 124 is in relatively close contact with the support plate 120 leakage is virtually avoided. To ensure that each of the orifices 134 are properly registered with opening 126 the detent means 122 acts to hold the metering plate 124 in proper position.

Detent means 122 includes coil spring 136, detent ball element 138 and detent recesses 140. The coil spring 136 and element 138 are received within an opening 142 formed in the support plate 120 and the former yieldingly biases the element 138 outwardly such that it contacts the metering plate 124. Whenever the element 138 is in a recess 140 it will fractionally lock the metering plate 124 in proper position. As can be appreciated, the metering adjustment means 60 enables an operator to vary the outflow of material to the desired preference of an operator. Consequently, the operator has the option to appropriately vary the output of material. Although the preferred embodiment discloses the metering adjustment means in association with one of the container means, it is certainly within the spirit and scope of this invention to have an adjustment means also associated with container means 18.

Having described the aforenoted constructional arrangement of components it is believed that the operation of the novel and improved metering apparatus of the present invention is readily evident. It will be appreciated that such metering apparatus provides for the dispensing of a plurality of materials, particularly viscous, in a predetermined ratio and yet in a simple and reliable manner which promotes efficient utilization of the materials dispensed.

While the invention has been described in connection with the preferred embodiment, it is not intended to limit the invention to the particular form set forth above, but to the contrary, it is intended to cover such alternatives, modifications, and equivalents as may be included within the spirit and scope of the invention as defined by the appended claims.

What is claimed is:

1. Apparatus for dispensing a plurality of materials in a predetermined ratio comprising at least two separate container means each of which contains a material, valve means including a valve member associated with each of said container means and being actuatable for enabling flow discharge of the material from each of said container means in a predetermined amount and second means including an interconnecting member being operatively interconnected to each of said valve members for actuating said valve means and thereby enabling the simultaneous discharge accurate control of the materials from said two container means said valve means includes an outlet opening having a predetermined size, said adjustment means includes a manually grippable and generally flat rotatable metering plate having a plurality of different dimensioned dispensing orifices, each with dimensions smaller than said outlet opening and being circumferentially spaced from each other for permitting the flow of fluid therethrough, and detent means for selectively locking each of said dispensing orifices adjacent said outlet opening for enabling adjustment of the flow rate from said one container means.

2. An apparatus as set forth in claim 1 which further comprises adjustment means associated with at least one of said valve means for enabling the independent adjustment of the material flowing from one of said container means.

3. An apparatus as set forth in claim 1 which further includes heating means operatively connected to said container means for decreasing the viscosity of viscous fluid.

4. An apparatus as set forth in claim 1 which further includes a mounting bracket which supports both of said containers.

5. An apparatus as set forth in claim 4 in which said mounting bracket supports both of said containers for pivotal movement about an upstanding support for said apparatus.

6. An apparatus as set forth in claim 2 which further includes pressure means operatively connected to said container means for supplying fluid under pressure to said container means, each of said container means including a generally cylindrical member with at least one open end portion, a removable cylinder head detachably connected to said open end portion, and at least a pair of circumferentially spaced generally vertical support rods, each of said support rods having one end which is detachably connected to said head member, at least one of said support rods having an elongatable opposite end means which has a generally open loop end pivotally connected to said support means for being generally elongated whenever excessive pressure forces develop in said container means which tend to expel the head from said container means and the other of said support rods having non-elongatable opposite end means which is rigidly secured to said support means for serving to maintain a portion of said head member adjacent said other support rod in substantial contact with said open end portion whenever excessive pressures elongate siad elongatable means to thereby permit a portion of said head member adjacent said one rod to rise or tilt above said open end portion to thereby vent said excessive pressure from said container means.

7. An apparatus as set forth in claim 1 which further includes means which ensures equal fluid pressure acting on the materials in each of said containers.

8. Apparatus for selectively dispensing predetermined ratios of viscous fluid from a plurality of discrete sources comprising at least two separate container means, each containing a different type of material to be dispensed, one of said container means having a first outlet opening means with a cross-sectional area which is at a predetermined ratio with respect to a second outlet opening means in the other of said container means, such that the ratio of material dispensed from said first opening means will correspond to the desired ratio intended to be mixed from the materials in said container means, valve means including a valve member associated with each of said first and second outlet opening means and being actuatable to selectively open and close said outlet opening means, and interconnection means including an interconnecting member interconnecting said valve members for enabling the simultaneous and uniform opening and closing of said first and second outlet opening means by said valve means, said valve means includes an outlet opening having a predetermined size, and further comprises adjustment means associated with at least one of said valve members for enabling the independent selective adjustment of the fluid material flowing from one of said container means and including a manually grippable and generally flat rotatable dispensing plate having a plurality of different dimensioned dispensing apertures, each with dimensions smaller than said outlet opening and circumferentially spaced from each other for permitting the flow of fluid therethrough, and detent means for selectively locking each of said dispensing apertures adjacent said outlet opening for enabling adjustment of the flow rate from said one container means.

9. An apparatus as set forth in claim 8 which further comprises heating means associated with said container means for selectively relatively decreasing viscosity of fluid material in said container means.

10. An apparatus as set forth in claim 8 in which said interconnection member is releasably connected to said valve member so as to enable individual actuation of said valve members whenever the interconnecting member is removed from the valve members.

11. Apparatus for dispensing material comprising means for containing material; pressure means connected to said means for containing material for supplying fluid under pressure thereto; said means for containing material including a generally hollow means with at least one open end portion, a removable head member detachably connected to said open end portion, and at least a pair of circumferentially spaced generally vertical support rods, each of said support rods having one end which is detachably connected to said head member, at least one of said support rods having an elongatable opposite end means having a generally open loop end operatively pivotally connected to said hollow means for being generally elongated whenever excessive pressure forces develop in said container means which tend to expel said head from said container means, and the other of said support rods having non-elongatable opposite end means which is operatively secured to said hollow means for maintaining a portion of said head member adjacent said other support rod in substantial contact with said open end portion whenever excessive pressures elongate said elongatable means to thereby permit a portion of said head adjacent said one rod to rise or tilt above said open end portion to thereby vent said excessive pressure.

12. An apparatus as set forth in claim 11 in which said non-elongatable opposite end of said other support rod is a closed loop end operatively pivotally connected to said hollow means.

13. Apparatus for dispensing material comrpising support means; container means mounted on said support means; and a pressure means connected to said container means for supplying fluid under pressure thereto; said container means including a generally tubular member with at least one open end portion, a removable cylinder head member detachably connected to said open end portion, and at least a pair of circumferentially spaced generally vertical support rods, each of said support rods having one end which is detachably connected to said head member, at least one of said support rods having an opposite end which has a generally elongatable open loop end pivotally connected to said support means, and the other of said support rods having an opposite end which has a non-elongatable closed loop end pivotally connected to said support means, whereby the elongatable open loop end will enable its support rod to elongate and the closed loop end will not elongate upon excessive pressure existing in the container means thereby permitting tilting of said head member.

14. Apparatus dispensing a plurality of materials in a predetermined ratio comprising at least two separate container means each of which contains a material, valve means including a valve member associated with each of said container means and being actuatable for enabling flow discharge of the material from each of said container means in a predetermined amount, second means including interconnecting member being operatively interconnected to each of said first means for actuating said valve means and thereby enabling the simultaneous discharge and accurate control of the materials from said two container means, adjustment means associated with at least one of said vlave means valve the independent adjustment of the material flowing from one of said container means, and said valve means includes an outlet opening having a predetermined size, said adjustment means includes a manually grippable and generally flat rotatable metering plate having a plurality of different dimensioned dispensing orifices each with dimensions smaller than said outlet opening and being circumferentially spaced from each other for permitting the flow of fluid therethrough, and detent means for selectively locking each of said dispensing orifices adjacent said outlet opening for enabling adjustment of the flow rate from said one container means.

* * * * *

UNITED STATES PATENT AND TRADEMARK OFFICE
CERTIFICATE OF CORRECTION

PATENT NO. : 4,033,480
DATED : July 5, 1977
INVENTOR(S) : Anthony E. Di Maio

It is certified that error appears in the above-identified patent and that said Letters Patent are hereby corrected as shown below:

Column 6, line 63, --the-- should appear between "that" and "under-".

Column 7, line 33, "suppor" should be --support--.

Column 10, line 19, "siad" should be --said--.

Column 12, line 20, --an-- should appear between "including" and "interconnecting"

Column 12, lines 25 and 26, "vlave means valve" should read --valve means for enabling--

Signed and Sealed this

Tenth Day of January 1978

[SEAL]

Attest:

RUTH C. MASON
Attesting Officer

LUTRELLE F. PARKER
Acting Commissioner of Patents and Trademarks